(12) United States Patent
Campbell et al.

(10) Patent No.: US 10,410,680 B2
(45) Date of Patent: *Sep. 10, 2019

(54) AUTOMATIC GENERATION OF VIDEO AND DIRECTIONAL AUDIO FROM SPHERICAL CONTENT

(71) Applicant: GoPro, Inc., San Mateo, CA (US)

(72) Inventors: Scott Patrick Campbell, Belmont, CA (US); Zhinian Jing, Belmont, CA (US); Timothy Macmillan, La Honda, CA (US); David A. Newman, San Diego, CA (US); Balineedu Chowdary Adsumilli, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,304

(22) Filed: Aug. 20, 2018

(65) Prior Publication Data

US 2019/0005987 A1 Jan. 3, 2019

Related U.S. Application Data

(63) Continuation of application No. 15/396,385, filed on Dec. 30, 2016, now Pat. No. 10,056,115, which is a (Continued)

(51) Int. Cl.
*G11B 27/30* (2006.01)
*H04N 9/82* (2006.01)
(Continued)

(52) U.S. Cl.
CPC ..... *G11B 27/3081* (2013.01); *H04N 5/23238* (2013.01); *H04N 5/77* (2013.01); (Continued)

(58) Field of Classification Search
None
See application file for complete search history.

(56) References Cited

U.S. PATENT DOCUMENTS

| 3,588,237 A | 6/1971 | Aldrich |
| 6,654,019 B2 | 11/2003 | Gilbert |

(Continued)

FOREIGN PATENT DOCUMENTS

| WO | 2009047572 A1 | 4/2009 |
| WO | 2014090277 A1 | 6/2014 |

OTHER PUBLICATIONS

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:l/cnmat.berkelev.edu/spatialaudiolectures>.

(Continued)

*Primary Examiner* — Hung Q Dang
(74) *Attorney, Agent, or Firm* — Esplin & Associates, PC

(57) ABSTRACT

A spherical content capture system captures spherical video and audio content. In one embodiment, captured metadata or video/audio processing is used to identify content relevant to a particular user based on time and location information. The platform can then generate an output video from one or more shared spherical content files relevant to the user. The output video may include a non-spherical reduced field of view such as those commonly associated with conventional camera systems. Particularly, relevant sub-frames having a reduced field of view may be extracted from each frame of spherical video to generate an output video that tracks a particular individual or object of interest. For each sub-frame, a corresponding portion of an audio track is generated that includes a directional audio signal having a directionality based on the selected sub-frame.

20 Claims, 14 Drawing Sheets

Related U.S. Application Data continuation of application No. 14/789,706, filed on Jul. 1, 2015, now Pat. No. 9,570,113.

(60) Provisional application No. 62/020,867, filed on Jul. 3, 2014.

(51) Int. Cl.
*H04N 9/806* (2006.01)
*H04N 5/77* (2006.01)
*H04N 5/232* (2006.01)

(52) U.S. Cl.
CPC ........... *H04N 9/806* (2013.01); *H04N 9/8205* (2013.01); *H04N 9/8211* (2013.01)

(56) References Cited

U.S. PATENT DOCUMENTS

| | | | |
|---|---|---|---|
| 6,788,333 | B1 | 9/2004 | Uyttendaele |
| 7,876,914 | B2* | 1/2011 | Grosvenor ............. H04H 60/47 |
| | | | 381/122 |
| 8,022,948 | B2 | 9/2011 | Garbow |
| 9,363,569 | B1 | 6/2016 | Van Hoff |
| 9,622,014 | B2 | 4/2017 | Chabanne |
| 9,807,533 | B2 | 10/2017 | Mehnert |
| 2003/0160862 | A1 | 8/2003 | Charlier |
| 2003/0210327 | A1 | 11/2003 | Mory |
| 2004/0010804 | A1 | 1/2004 | Hendricks |
| 2004/0125133 | A1 | 7/2004 | Pea |
| 2005/0222844 | A1 | 10/2005 | Kawahara |
| 2005/0226483 | A1 | 10/2005 | Geiger |
| 2009/0046864 | A1 | 2/2009 | Mahabub |
| 2009/0278917 | A1 | 11/2009 | Dobbins |
| 2010/0034404 | A1* | 2/2010 | Dent ........................ H04R 5/02 |
| | | | 381/310 |
| 2010/0281375 | A1 | 11/2010 | Pendergast |
| 2010/0299630 | A1 | 11/2010 | McCutchen |
| 2011/0013778 | A1 | 1/2011 | Takumai |
| 2011/0013790 | A1* | 1/2011 | Hilpert ................. G10L 19/008 |
| | | | 381/300 |
| 2011/0171612 | A1* | 7/2011 | Gelinske ................. G09B 9/08 |
| | | | 434/35 |
| 2012/0206565 | A1 | 8/2012 | Villmer |
| 2012/0207309 | A1 | 8/2012 | Eppolito |
| 2013/0058532 | A1 | 3/2013 | White |
| 2013/0058535 | A1 | 3/2013 | Othmezouri |
| 2013/0177168 | A1 | 7/2013 | Inha |
| 2014/0039884 | A1 | 2/2014 | Wei-ge Chen |
| 2014/0133682 | A1 | 5/2014 | Chabanne |
| 2014/0300636 | A1 | 10/2014 | Miyazaya |
| 2015/0029304 | A1* | 1/2015 | Park ................... H04N 5/23238 |
| | | | 348/36 |
| 2015/0146873 | A1 | 5/2015 | Chabanne |
| 2016/0111096 | A1* | 4/2016 | Oh ........................ G10L 19/008 |
| | | | 381/22 |
| 2016/0112819 | A1 | 4/2016 | Mehnert |
| 2017/0084086 | A1 | 3/2017 | Pio |
| 2017/0085964 | A1 | 3/2017 | Chen |

OTHER PUBLICATIONS

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.

PCT International Search Report and Written Opinion for PCT/US15/38913, dated Sep. 29, 2015, 15 Pages.

United States Office Action, U.S. Appl. No. 14/789,706, dated Jun. 7, 2016, ten pages.

Kopf et al., "First-person Hyper-Lapse Videos" ACM Transactions on Graphics (Proceedings of SIGGRAPH 2014), 33(4), Article No. 78, 2014 (10 pages).

* cited by examiner

Video Window

AUTOMATIC GENERATION OF VIDEO AND DIRECTIONAL AUDIO FROM SPHERICAL CONTENT

BACKGROUND

Technical Field

This disclosure relates to a media content system, and more specifically, to a media content system using spherical video and directional audio.

Description of the Related Art

In a spherical video capture system, a video camera system (which may include multiple video cameras) captures video in a 360 degree field of view along a horizontal axis and 180 degree field of view along the vertical axis, thus capturing the entire environment around the camera system in every direction. Current spherical video systems have not gained widespread use because high resolution, high frame rate video captured by such systems are extremely large and difficult to process and manage.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. (or "FIG.") 1 illustrates an example representation of a spherical video and a non-spherical video generated from the spherical content.

DETAILED DESCRIPTION

Figure 1:
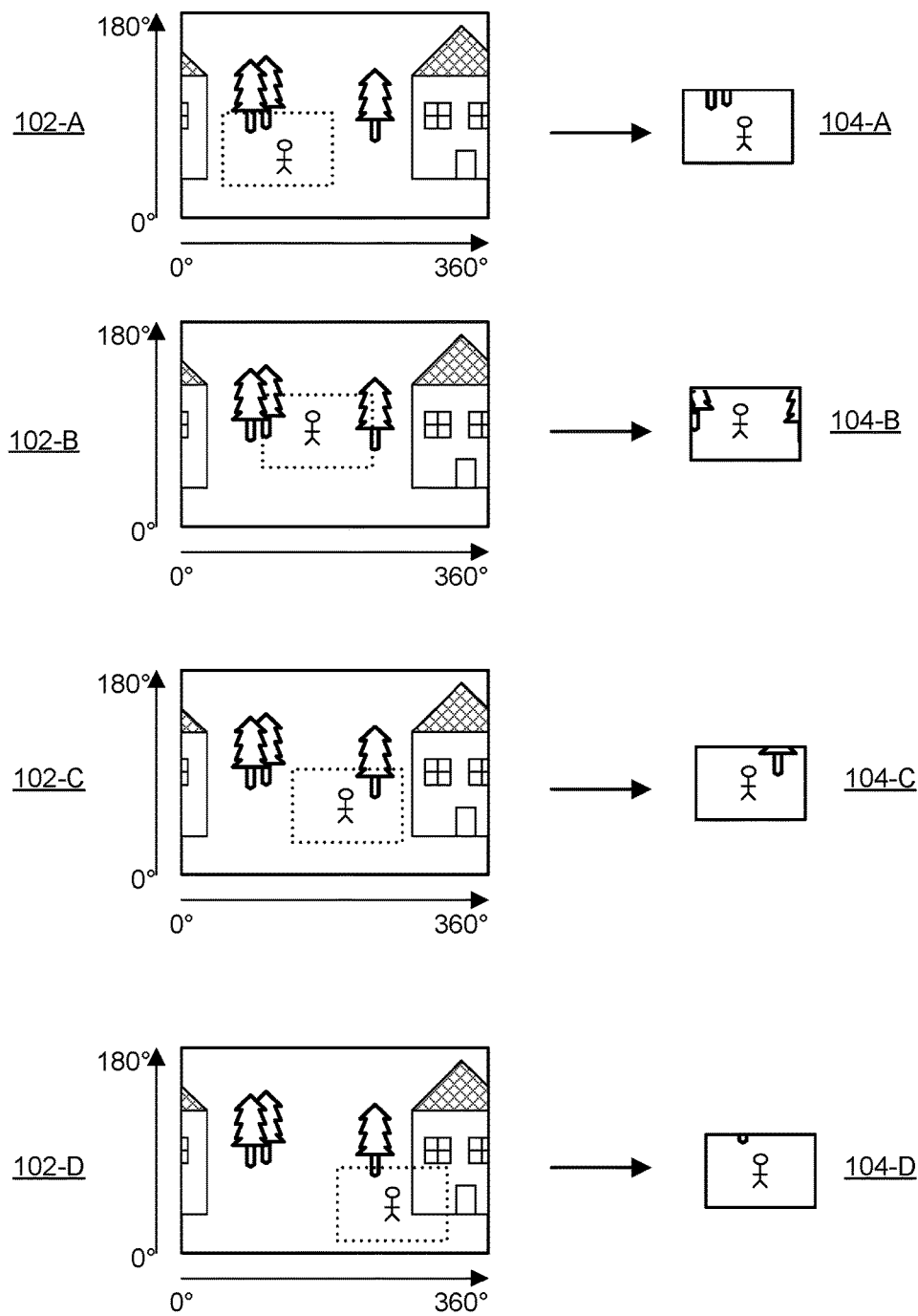

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A spherical content capture system captures spherical video content. A microphone array system captures audio concurrently with the video and produces a plurality of audio channels comprising directional audio signals corresponding to different directions. A spherical content sharing platform enables users to share the captured spherical content and enables users to access spherical content shared by other users. By definition, a spherical camera will capture everything in the surrounding environment (e.g., 360 degrees in the horizontal plane and 180 degrees in the vertical plane). While only a small portion of the captured content may be relevant to operator of the camera, the remainder of the captured content may be relevant to a community of other users. For example, any individuals that were in the vicinity of a spherical camera capturing spherical video content are likely to appear somewhere in the captured content, and may therefore be interested in the content. Thus, any captured spherical content may be meaningful to a number of different individuals and a community of users may benefit from sharing of spherical video content. As one example, a group of people each record their actions on a spherical camera and allow shared access to the captured content. Each individual in the group is then capable of extracting relevant and meaningful content from a shared capture, different portions of which will be relevant to different members of the group or others outside of the group.

In one embodiment, metadata included in the spherical content is used to identify content relevant to a particular user (e.g., based on time and location information). Alternatively, the content relevant to a particular user may be determined by processing the spherical video itself (e.g., by performing content recognition) or its corresponding audio channels. The platform can then generate an output video from one or more shared spherical content files relevant to the user. The output video may include a non-spherical reduced field of view such as those commonly associated with conventional camera systems (e.g., a 120 degree by 67 degree field of view). For example, a relevant sub-frame having a reduced field of view may be extracted from each frame of spherical video to generate the output video. For example, sub-frames may be selected to generate an output video that track a particular individual, object, scene, or activity of interest. The output video thus reduces the captured spherical content to a standard field of view video having the content of interest while eliminating extraneous data outside the targeted field of view.

As with the output video, the output audio may have a smaller audible field or may be directionally weighted such that audio from a particular direction or range of directions is more prominent. As the viewing window changes in a captured spherical scene, the audio changes accordingly. Thus, an audio track may be generated to correspond to the output video such that for each sub-frame of the of the output video, the directionality associated with the audio track corresponds to the location of the selected sub-frame. For example, if the location of the extracted sub-frames are selected to simulate a left-to-right pan across a scene, the audio track will be generated in a manner that simulates a microphone panning from left to right (i.e., weighting audio from the left side of the scene more heavily at the beginning of the pan and weighting audio from the right side of the scene more heavily at the end of the pan). Furthermore, if the video is zoomed to reduce the field of view, the audio may similarly be adjusted to be more directionally focused in the zoomed direction. Thus, for example, sound originating from a subject shown in the output video may be heard more prominently than sound originating from a subject outside the field of view. In one embodiment, audio from different directions is weighted in order to create a realistic audio experience. For example, audio from directions other than where the viewer is focused may be present in the recreated audio, but the various channels may be weighted such that the audio in the viewing direction is most prominent. Thus, the output video simulates both visually and audibly a video captured with a standard field of view camera that is manually pointed to track an individual, object, or scene of interest. As will be apparent, many different output videos can be generated from the same set of shared spherical video content.

In a particular embodiment, a method, video server, and non-transitory computer-readable storage medium generates a video with corresponding audio. A spherical video is received. A plurality of audio channels is also received representing audio captured concurrently with the spherical video, where each of the plurality of audio channels comprising directional audio corresponding to a different direction. Different spatial regions of the spherical video are mapped to different audio channels. For each of a plurality of frames of the spherical video, a sub-frame is extracted having a reduced field of view relative to a field of view of the spherical video. For each of the sub-frames, a processor determines one or more of the spatial regions overlapping the sub-frame and generates a portion of an audio stream from one or more different audio channels corresponding to the one or more spatial regions overlapping the sub-frame. The generated video and the audio stream is then outputted.

Additional embodiments are described in further detail below.

Generation of Output Video from Spherical Content

FIG. 1 illustrates an example representation of a spherical video illustrated as a sequence of spherical video frames 102 (e.g., frames 102-A, 102-B, 102-C, 102-D). In the illustrated embodiment, the spherical video frames 102 are projected to a rectangular image. In practice, the spherical video may be encoded in any of a number of possible file formats including circular formats, rectangular formats, oval formats, etc. As can be seen, because spherical video captures in every direction, the captured scene wraps around the edges (e.g., the house in FIG. 1 is approximately 180 degrees from the center of the image from the perspective of the camera). To generate the output video, a relevant sub-frame 104 is extracted from each of the spherical frames 102 (e.g., sub-frames that track the path of the person). Thus, the output video has a non-spherical (e.g., standard) field of view and provides the appearance of a camera panning across the scene to track the person's path. Similarly, in the audio track, audio channels corresponding to different directions are variably weighted over time to provide an output audio track that has a variable directionality that approximately follows the person's path. As can be seen, different output videos could be created from the same raw spherical video by extracting different sequences sub-frames depicting other individuals or objects of interest and generating corresponding audio tracks. As the number of shared videos in the sharing platform increases, the likelihood of users being able to find videos of relevance increases substantially.

In one embodiment, a community content sharing platform enables individuals to subscribe to a community of users. The subscribers are provided access to video captured by not only themselves but also the wider group. The community content sharing platform may effectively be a public open-source resource for everyone to find and use meaningful content of themselves from a plurality of different spherical camera sources.

Example Spherical Media Content System

Figure 2:
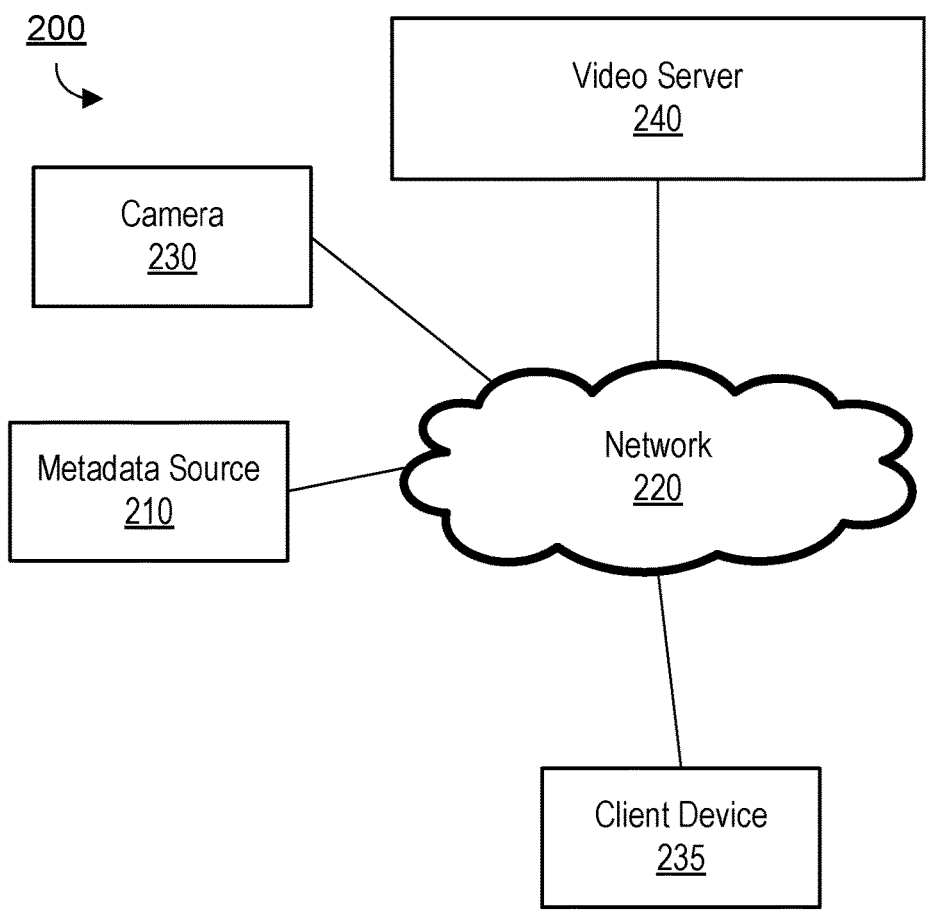
FIG. 2 illustrates an example embodiment of a media content system.

FIG. 2 is a block diagram of a media content system 200, according to one embodiment. The media content system 200 includes one or more metadata sources 210, a network 220, a camera 230, a client device 235 and a video server 240. In alternative configurations, different and/or additional components may be included in the media content system 200. Examples of metadata sources 210 include sensors (such as accelerometers, speedometers, rotation sensors, GPS sensors, altimeters, and the like), camera inputs (such as an image sensor, microphones, buttons, and the like), and data sources (such as clocks, external servers, web pages, local memory, and the like). In some embodiments, one or more of the metadata sources 210 can be included within the camera 230. Alternatively, one or more of the metadata sources 210 may be integrated with a client device 235 or another computing device such as, for example, a mobile phone.

The camera 230 can include a camera body one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. One or more cameras 230 is capable of capturing spherical or substantially spherical content and capturing audio via a multi-directional microphone array. As used herein, spherical content may include still images or video having spherical or substantially spherical field of view. For example, in one embodiment, the camera 230 captures video having a 360 degree field of view in the horizontal plane and a 180 degree field of view in the vertical plane. Alternatively, the camera 230 may capture substantially spherical video having less than 360 degrees in the horizontal direction and less than 180 degrees in the vertical direction (e.g., within 10% of the field of view associated with fully spherical content).

As described in greater detail in conjunction with FIG. 3 below, the camera 230 can include sensors to capture metadata associated with video data, such as timing data, motion data, speed data, acceleration data, altitude data, GPS data, and the like. In a particular embodiment, location and/or time centric metadata (geographic location, time, speed, etc.) can be incorporated into a media file together with the captured spherical content in order to track the location of the spherical camera 230 over time. This metadata may be captured by the camera 230 itself or by another device (e.g., a mobile phone) proximate to the camera 230. In one embodiment, the metadata may be incorporated with the content stream by the camera 230 as the spherical content is being captured. In another embodiment, a metadata file separate from the spherical video file may be captured (by the same capture device or a different capture device) and the two separate files can be combined or otherwise processed together in post-processing.

The video server 240 receives and stores videos captured by the camera 230 and allows users to access shared videos at a later time. In one embodiment, the video server 240 provides the user with an interface, such as a web page or native application installed on the client device 235, to interact with and/or edit the stored videos and to automatically generate output videos relevant to a particular user (or a particular set of metadata) from one or more stored spherical videos. The output videos may have a reduced field of view relative to the original spherical videos. For example, an output video may have a field of view consistent with that of a conventional non-spherical camera such as, for example, a 120 degree by 67 degree field of view. To generate the output video, the video server 240 extracts a sequence of relevant sub-frames having the reduced field of view from frames of one or more spherical videos and processes audio signals captured from the microphone array to generate an audio track having directionality that varies based on the selected sub-frames. For example, sub-frames may be selected from one or more spherical videos to generate an output video that tracks a path of a particular individual or object. In one embodiment, the video server 240 can automatically identify sub-frames by finding identifying spherical video that was captured near a particular location and time where a user was present (or other time and location of interest). Because spherical content is captured in all directions, the spherical video captured at the particular time and location where the user was present is highly likely to include sub-frames depicting the user (or scene of interest). In another embodiment, a time-varying path (e.g., a sequence of time-stamped locations) of a target (e.g., a person, object, or other scene of interest) can be used to automatically find spherical video having time and location metadata closely matching the path. Furthermore, by correlating the relative location of the camera 230 with a location at each time point in the path of interest, the video server 240 can automatically determine a direction between the camera 230 and the target and thereby automatically select the appropriate sub-frames depicting the target. Furthermore, an audio track can be generated having a directionality that varies over time based on the determined direction between the camera 230 and the target so as to more heavily weight audio coming from the direction of the target. Because the original spherical video captures video in all directions, many different output videos can be generated from the same set of shared spherical video content.

In an embodiment, the video server 240 generates the output video based on an input metadata that includes a target path represented by a sequence of time-stamped target locations. For example, the person depicted in FIG. 1 may carry a tracking device (e.g., a camera, mobile device, or other tracking device) that tracks his location. For each time-stamped target location, the video server 240 identifies spherical content that has a metadata tag including a timestamp and location that match (or best match) the time-stamped location in the input metadata sequence. Based on the relative location information, the video server 240 can also determine a direction between the camera and the target and thereby select a sub-frame capturing the target and provide output audio weighted according to the determined direction. In other embodiments, output videos may be generated based on two or more spherical video files shared on the video server.

As one example use case scenario, a skier at a ski resort may use an application on his mobile phone to track his movement through the ski resort. One or more other users capture spherical video content one the same day at the same ski resort and share the spherical content on the video server, some of which will depict the skier. By correlating the time/location metadata tracking the skier's movement with time/location metadata associated with the spherical video files, the video server can automatically locate a sequence of sub-frames from one or more of the spherical videos that depict the skier and follow his path through the resort. Further still, other skiers can input a different set of time/location metadata and obtain their own customized videos from the same set of captured spherical content. If multiple skiers record and share spherical content, the volume of relevant video for any individual skier is multiplied. Thus, as the size of the sharing community increases, the relevance of the spherical content to any giving user increases rapidly.

In other embodiments, the video server 240 can automatically identify sub-frames of interest based on the spherical video content itself or its associated audio track. For example, facial recognition, object recognition, motion tracking, or other content recognition or identification techniques may be applied to the spherical video to identify sub-frames of interest. Alternatively, or in addition, a microphone array may be used to determine directionality associated with a received audio signal, and the sub-frames of interest may be chosen based on the direction between the camera and the audio source. These embodiments beneficially can be performed without any location tracking of the target of interest. Further still, any of the above techniques may be used in combination to automatically determine which sub-frames to select for generating an output video.

A user can interact with interfaces provided by the video server 240 via the client device 235. The client device 235 is any computing device capable of receiving user inputs as well as transmitting and/or receiving data via the network 220. In one embodiment, the client device 235 is a conventional computer system, such as a desktop or a laptop computer. Alternatively, the client device 235 may be a device having computer functionality, such as a personal digital assistant (PDA), a mobile telephone, a smartphone or another suitable device. The user can use the client device 235 to view and interact with or edit videos stored on the video server 240. For example, the user can view web pages including video summaries for a set of videos captured by the camera 230 via a web browser on the client device 235.

One or more input devices associated with the client device 235 receive input from the user. For example, the client device 235 can include a touch-sensitive display, a keyboard, a trackpad, a mouse, a voice recognition system, and the like. In some embodiments, the client device 235 can access video data and/or metadata from the camera 230 or one or more metadata sources 210, and can transfer the accessed metadata to the video server 240. For example, the client device may retrieve videos and metadata associated with the videos from the camera via a universal serial bus (USB) cable coupling the camera 230 and the client device 235. The client device 235 can then upload the retrieved videos and metadata to the video server 240. In one embodiment, the client device 235 interacts with the video server 240 through an application programming interface (API) running on a native operating system of the client device 235, such as IOS® or ANDROID™. While FIG. 2 shows a single client device 235, in various embodiments, any number of client devices 235 may communicate with the video server 240.

The video server 240 communicates with the client device 235, the metadata sources 210, and the camera 230 via the network 220, which may include any combination of local area and/or wide area networks, using both wired and/or wireless communication systems. In one embodiment, the network 220 uses standard communications technologies and/or protocols. In some embodiments, all or some of the communication links of the network 220 may be encrypted using any suitable technique or techniques. It should be noted that in some embodiments, the video server 240 is located within the camera 230 itself.

Various components of the environment 200 of FIG. 2 such as the camera 230, metadata source 210, video server 240, and client device 225 can include one or more processors and a non-transitory computer-readable storage medium storing instructions therein that when executed cause the processor to carry out the functions attributed to the respective devices described herein.

Example Camera Configuration

Figure 3:
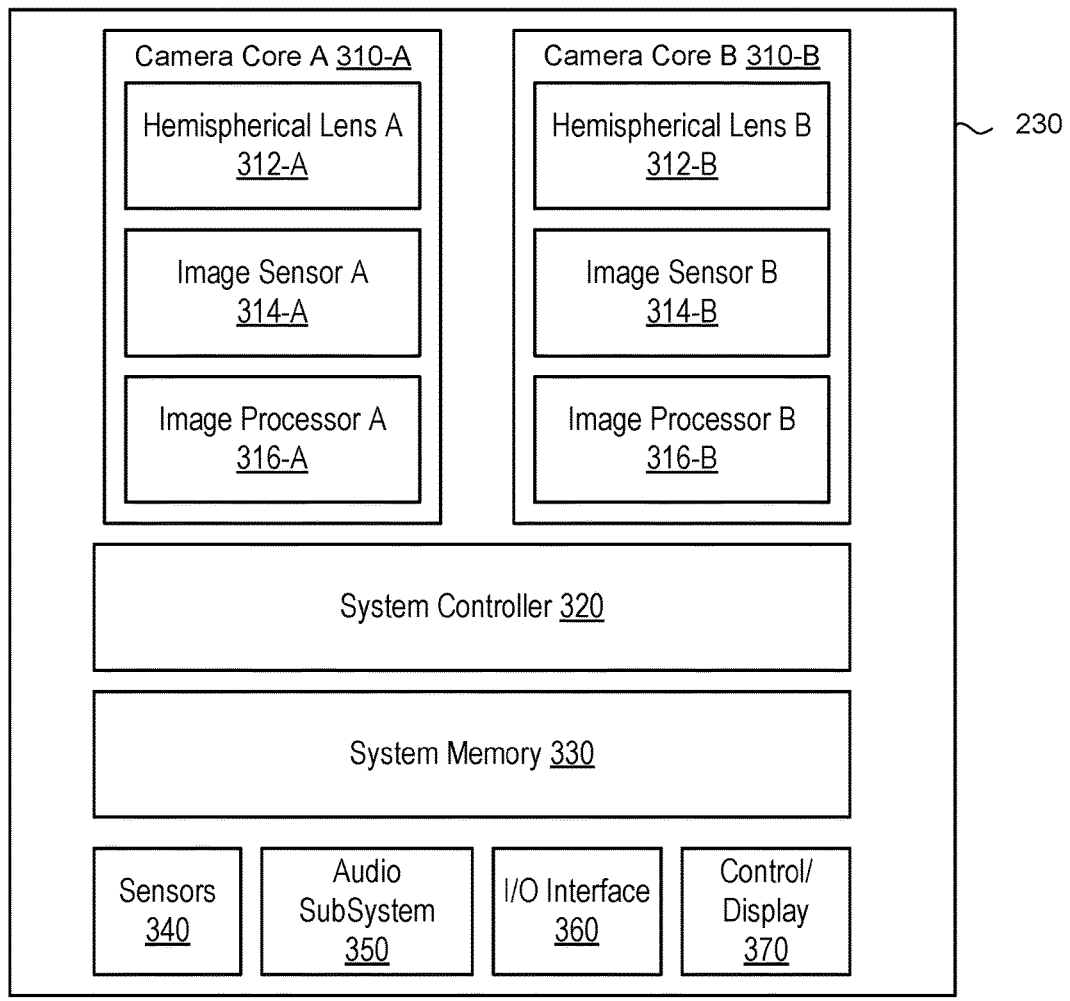
FIG. 3 illustrates an example architecture of a camera.

FIG. 3 is a block diagram illustrating a camera 230, according to one embodiment. In the illustrated embodiment, the camera 230 comprises two camera cores 310 (e.g., camera core A 310-A and camera core B 310-B) each comprising a hemispherical lens 312 (e.g., hemispherical lens 312-A and hemispherical lens 312-B), an image sensor 314 (e.g., image sensor 314-A and image sensor 314-B), and an image processor 316 (e.g., image processor 316-A and image processor 316-B). The camera 230 additional includes a system controller 320 (e.g., a microcontroller or microprocessor) that controls the operation and functionality of the camera 230 and system memory 330 configured to store executable computer instructions that, when executed by the system controller 320 and/or the image processors 316, perform the camera functionalities described herein.

An input/output (I/O) interface 360 transmits and receives data from various external devices. For example, the I/O interface 360 may facilitate the receiving or transmitting video or audio information through an I/O port. Examples of I/O ports or interfaces include USB ports, HDMI ports, Ethernet ports, audioports, and the like. Furthermore, embodiments of the I/O interface 360 may include wireless ports that can accommodate wireless connections. Examples of wireless ports include Bluetooth, Wireless USB, Near Field Communication (NFC), and the like. The I/O interface 360 may also include an interface to synchronize the camera 230 with other cameras or with other external devices, such as a remote control, a second camera 230, a smartphone, a client device 335, or a video server 340.

A control/display subsystem 370 includes various control a display components associated with operation of the camera 230 including, for example, LED lights, a display, buttons, microphones, speakers, and the like.

The audio subsystem 350 includes an array of microphones (e.g., at least two microphones) and one or more audio processors to capture and process audio data correlated with video capture. The microphones are positioned in a manner that enables audio to be captured from various directions. A plurality of audio channels are generated each corresponding to a different direction. In one embodiment, each audio channel simply corresponds to audio captured by one the microphones. For example, in a six microphone array having microphones facing in the up, down, left, right, front, and back directions, six audio channels are generated corresponding to each of these directions. In alternative embodiments, audio beamforming techniques may be used to generate directional audio channels from weighted combinations of different microphones so that, for example, six audio channels corresponding to the up, down, left, right, front, and back directions can be generated from fewer than six microphones. Each audio channel has an associated directionality in that audio originating from a source in the associated direction is more heavily weighted than audio in originating from sources from other directions. For example, when an individual is speaking, an audio channel in the direction of the speaker would include the speaker at relatively high volume relative to background noise, while an audio channel in a direction opposite the speaker may include the speaker at a reduced or inaudible volume.

Sensors 340 capture various metadata concurrently with, or separately from, video capture. For example, the sensors 340 may capture time-stamped location information based on a global positioning system (GPS) sensor, and/or an altimeter. Other sensors 340 may be used to detect and capture orientation of the camera 230 including, for example, an orientation sensor, an accelerometer, a gyroscope, or a magnetometer. Sensor data captured from the various sensors 340 may be processed to generate other types of metadata. For example, sensor data from the accelerometer may be used to generate motion metadata, comprising velocity and/or acceleration vectors representative of motion of the camera 230. Furthermore, sensor data from the may be used to generate orientation metadata describing the orientation of the camera 230. Sensor data from the GPS sensor provides GPS coordinates identifying the location of the camera 230, and the altimeter measures the altitude of the camera 230. In one embodiment, the sensors 340 are rigidly coupled to the camera 230 such that any motion, orientation or change in location experienced by the camera 230 is also experienced by the sensors 340. The sensors 340 furthermore may associates a time stamp representing when the data was captured by each sensor. In one embodiment, the sensors 340 automatically begin collecting sensor metadata when the camera 230 begins recording a video.

In alternative embodiments, one or more components of the camera cores 310 may be shared between different camera cores 310. For example, in one embodiment, the camera cores 310 may share one or more image processors 316. Furthermore, in alternative embodiments, the camera cores 310 may have additional separate components such as, for example, dedicated system memory 330 or system controllers 320. In yet other embodiments, the camera 230 may have more than two camera cores 310 or a single camera core with a 360° lens or a single hyper-hemi (super fish-eye) lens.

In one embodiment, the camera 230 comprises a twin hyper-hemispherical lens system that capture two image hemispheres with synchronized image sensors which combine to form a contiguous spherical image. The image hemispheres may be combined based on, for example, a back-to-back configuration, a side-by-side configuration, a folded symmetrical configuration or a folded asymmetrical configuration. Each of the two streams generated by camera cores 310 may be separately encoded and then aggregated in post processing to form the spherical video. For example, each of the two streams may be encoded at 2880×2880 pixels at 30 frames per second and combined to generate a 5760×2880 spherical video at 30 frames per second. Other resolutions and frame rates may also be used.

In an embodiment the spherical content is captured at a high enough resolution to guarantee the desired output from the relevant sub-frame will be of sufficient resolution. For example, if a horizontal field of view of 120° at an output resolution of 1920×1080 pixels is desired in the final output video, the original spherical capture may include a horizontal 360° resolution of at least 5760 pixels (3×1920).

In one embodiment, a 5.7K spherical file format provides 16 megapixel resolution. This provides a resolution of approximately one pixel per inch at a distance of 23 meters (76 feet) from the camera 230. In this embodiment, spherical video is captured as 5760 pixels by 2880 pixels with a 360 degree horizontal field of view and a 180 degree vertical field of view. In one embodiment, the image sensor may capture 6 k×3 k image to provide six degrees of overlap and 4 degrees of out-of-field image to avoid worst modulation transfer function (MTF) region from the lens. From the spherical image frames, a 1920×1080 sub-frame may be extracted that provides a 120 degree by 67.5 degree field of view. As described above, the location of the sub-frame may be selected to capture sub-frames of interest to a given user. In one embodiment, each of two image sensors capture 3 k×3 k images which are encoded as 2880×2880 images, which are combined to create the 5760×2880 spherical image.

In another embodiment, a 720p file format is used. Here, spherical video is represented as 4000 pixels by 2000 pixels with a 360 degree horizontal field of view and a 180 degree vertical field of view. In one embodiment, the 4 k×2 k image may be based on a 4000 pixels×2250 pixels image captured by the image sensor to provide some overlap in the vertical direction. From the spherical image frames, a 720×1280 sub-frame may be extracted from each frame that provides a 115 degree by 65 degree field of view.

In one embodiment, the camera 230 includes a computational image processing chip that aggregates the two data streams into one encoding internally to the camera 230. The camera 230 can then directly output the spherical content or a downscaled version of it. Furthermore, in this embodiment, the camera 230 may directly output sub-frames of the captured spherical content having a reduced field of view based on user control inputs specifying the desired sub-frame locations.

Figure 4:
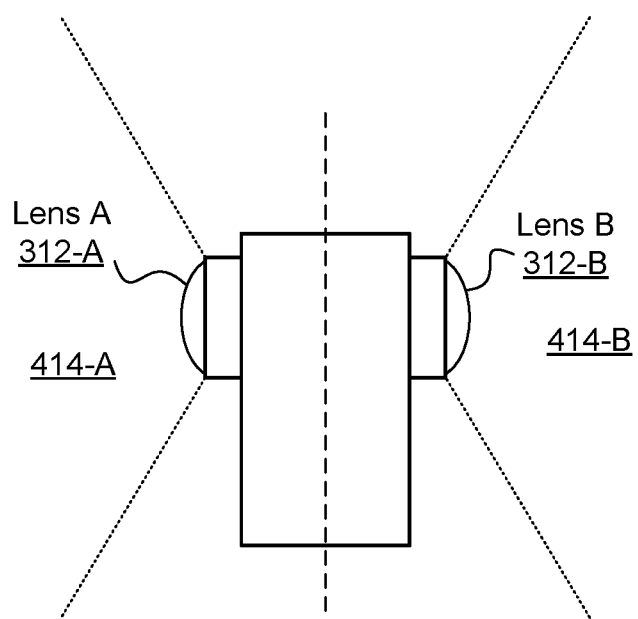
FIG. 4 illustrates a side view of an example embodiment of a camera.

FIG. 4 illustrates a side view of an example camera 230. As can be seen, the camera 230 includes a first hemispherical lens 312-A capturing a first field of view 414-A and a second hemispherical lens 312-B capturing a second field of view 414-B. The fields of view 414-A, 414-B may be stitched together in the camera 230 or in post-processing to generate the spherical video.

Example Video Server Architecture

Figure 5:
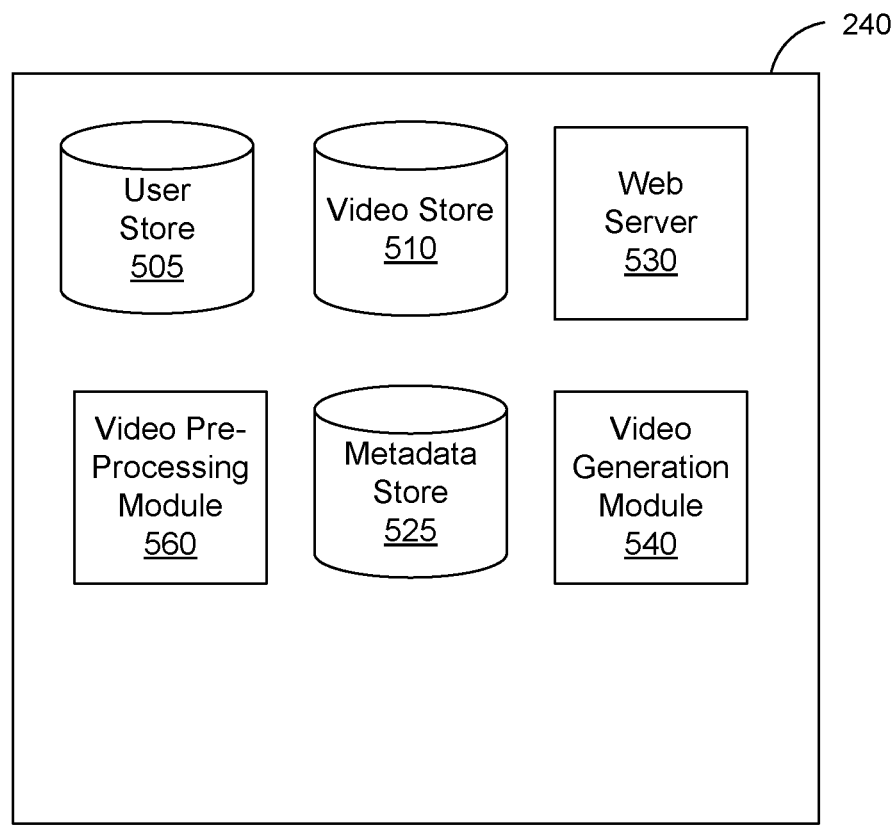
FIG. 5 illustrates an example embodiment of a video server.

FIG. 5 is a block diagram of an architecture of the video server 240. In the illustrated embodiment, the video server 240 comprises a user storage 505, a video storage 510, a metadata storage 525, a web server 530, a video generation module 540, and a video pre-processing module 560. In other embodiments, the video server 240 may include additional, fewer, or different components for performing the functionalities described herein. Conventional components such as network interfaces, security functions, load balancers, failover servers, management and network operations consoles, and the like are not shown so as to not obscure the details of the system architecture.

In an embodiment, the video server 240 enables users to create and manage individual user accounts. User account information is stored in the user storage 505. A user account may include information provided by the user (such as biographic information, geographic information, and the like) and may also include additional information inferred by the video server 240 (such as information associated with a user's historical use of a camera and interactions with the video server 240). Examples of user information include a username, contact information, a user's hometown or geographic region, other location information associated with the user, other users linked to the user as "friends," and the like. The user storage 505 may include data describing interactions between a user and videos captured by the user. For example, a user account can include a unique identifier associating videos uploaded by the user with the user's user account. Furthermore, the user account can include data linking the user to other videos associated with the user even if the user did not necessarily provide those videos. For example, the user account may link the user to videos having location metadata matching the user's location metadata, thus indicating that the video was captured at a time and place where the user was present and the user is therefore highly likely to be depicted somewhere in the video.

The video storage 510 stores videos captured and uploaded by users of the video server 240. The video server 240 may access videos captured using the camera 230 and store the videos in the video storage 510. In one example, the video server 240 may provide the user with an interface executing on the client device 235 that the user may use to upload videos to the video storage 515. In one embodiment, the video server 240 indexes videos retrieved from the camera 230 or the client device 235, and stores information associated with the indexed videos in the video store. For example, the video server 240 provides the user with an interface to select one or more index filters used to index videos. Examples of index filters include but are not limited to: the time and location that the video was captured, the type of equipment used by the user (e.g., ski equipment, mountain bike equipment, etc.), the type of activity being performed by the user while the video was captured (e.g., snowboarding, mountain biking, etc.), or the type of camera 230 used to capture the content.

In some embodiments, the video server 240 generates a unique identifier for each video stored in the video storage 510 which may be stored as metadata associated with the video in the metadata storage 525. In some embodiments, the generated identifier for a particular video is unique to a particular user. For example, each user can be associated with a first unique identifier (such as a 10-digit alphanumeric string), and each video captured by a user is associated with a second unique identifier made up of the first unique identifier associated with the user concatenated with a video identifier (such as an 8-digit alphanumeric string unique to the user). Thus, each video identifier is unique among all videos stored at the video storage 510, and can be used to identify the user that captured the video.

In some embodiment, in addition to being associated with a particular user, a video may be associated with a particular community. For example, the video provider may choose to make the video private, make the video available with the entire public, or make the video available to one or more limited specified community such as, for example, the user's friends, co-workers, members in a particular geographic region, etc.

The metadata storage 525 stores metadata associated with videos stored by the video storage 510 and with users stored in the user storage 505. Particularly, for each video, the metadata storage 525 stores metadata including time-stamped location information associated with each frame of the video to indicate the location of the camera 230 at any particular moment during capture of the spherical content. Additionally, the metadata storage 525 may store other types of sensor data captured by the camera 230 in association with a video including, for example, gyroscope data indicating motion and/or orientation of the device. In some embodiments, metadata corresponding to a video is stored within a video file itself, and not in a separate storage module. The metadata storage 525 may also store time-stamped location information associated with a particular user so as to represent a user's physical path during a particular time interval. This data may be obtained from a camera held by the user, a mobile phone application that tracks the user's path, or another metadata source.

The web server 530 provides a communicative interface between the video server 240 and other entities of the environment of FIG. 2. For example, the web server 530 can access videos and associated metadata from the camera 230 or the client device 235 to store in the video storage 510 and the metadata storage 525, respectively. The web server 530 can also receive user input provided to the client device 235, can request automatically generated output videos relevant to the user generated from the stored spherical video content as will be described below. The web server 530 may furthermore include editing tools to enables users to edit videos stored in the video storage 510.

A video pre-processing module 560 pre-processes and indexes uploaded videos. For example, in one embodiment, uploaded videos are automatically processed by the video pre-processing module 560 to conform the videos to a particular file format, resolution, etc. Furthermore, in one embodiment, the video pre-processing module 560 may automatically parse the metadata associated with videos upon being uploaded to determine the temporal and spatial path of the camera. The video pre-processing module 560 may furthermore automatically correlate the camera path to path data associated with the users in order to identify users that were in the vicinity of the camera when it was capturing the spherical content and are therefore likely to appear somewhere in the spherical video. In an embodiment, a user may be automatically alerted when new spherical video is uploaded that has metadata closely matching the user's metadata, thus indicating the video was taken in the vicinity of the user. Additionally, the video pre-processing module 560 may automatically perform audio and/or video processing algorithms to identify sub-frames of interest independently of known target locations. For example, the video pre-processing module 560 may perform facial recognition and facial tracking to identify an individual in a spherical video and tag that person in the video. Additionally, content recognition may be performed to identify particular objects in the video. In another embodiment, motion detection may be performed to identify regions of the video having certain motion parameters that may represent an activity of interest. In yet another embodiment, gesture recognition may be performed to identify regions of the video having an individual performing a particular gesture. In yet another embodiment, audio processing and/or speech recognition may be performed based on a microphone array input to identify locations of one or more audio sources in the spherical video.

The video generation module 540 automatically generates output videos relevant to a user or to a particular set of inputs. For example, the video generation module 540 may generate an output video including content that tracks a sequence of locations representing a physical path over a particular time interval and produces a corresponding audio track that varies the directionality of the captured audio based on the tracked sequence of locations. Alternatively, the video generation module 540 may generate an output video including content that tracks a particular face or object identified in the video, tracks an area of motion having particular motion characteristics, tracks an identified audio source, etc. The output videos have a reduced field of view (e.g., a standard non-spherical field of view) and represent relevant sub-frames to provide a video of interest. For example, the video may track a particular path of an individual, object, or other target so that each sub-frame depicts the target as the target moves through a given scene. In one embodiment, the video generation module 540 may operate in response to a user querying the video server 240 with particular input criteria. In another embodiment, the video generation module 540 may automatically generate videos relevant to users of the community based on metadata or profile information associated with user and automatically provide the videos to the user when it is identified as being relevant to the user (e.g., via their web portal, via email, via text message, or other means).

In an embodiment, the video server 240 enables the user to select from predefined video generation templates. For example, the user can request that the video server 240 generate a video based on location tracking, based on facial recognition, gesture recognition, audio tracking, motion detection, or other technique. Various parameters used by the video server 240 to select relevant frames such as thresholds governing proximity distance and clip duration can be adjusted or pre-set.

In an embodiment, content manipulation is performed on the video server 240 with edits and playback using only the original source content. In this embodiment, when generating an output video, the video server 140 saves an edit map indicating, for each frame of the output video, the original spherical video file from which the sub-frame was extracted and the location of the sub-frame. The edit map may furthermore store any processing edits performed on the video such as, for example, image warping, image stabilization, output window orientation, image stitching changes in frame rate or formatting, audio mixing, effects, etc. In this embodiment, no copying, storing, or encoding of a separate output video sequences is necessary. This beneficially minimizes the amount of data handled by the server. When users views a previously saved output video, the server 240 re-generates the output video based on the saved edit map by retrieving the relevant sub-frames from the original source content and regenerates a corresponding audio track with directionality based on the selected sub-frames. Alternatively, the user may select to download a copy of the output video, for storing in the user's local storage.

In an embodiment, the user interface also provides an interactive viewer that enables the user to pan around within the spherical content being viewed. This will allow the user to search for significant moments to incorporate into the output video and manually edit the automatically generated video.

In one embodiment, the user interface enables various editing effects to be added to a generated output video. For example, the video editing interface may enable effects such as, cut-away effects, panning, tilting, rotations, reverse angles, image stabilization, zooming, object tracking, In one embodiment, spherical content may also be processed to improve quality. For example, in one embodiment, dynamic stabilization is applied to stabilize in the horizontal, vertical, and rotational directions. Because the content is spherical, stabilization can be performed with no loss of image resolution. Stabilization can be performed using various techniques such as object tracking, vector map analysis, on-board gyro data, etc. For example, an in-view camera body can be used as a physical or optical reference for stabilization. Spherical content may also be processed to reduce rolling shutter artifacts. This may be performed using on-board gyro motion data or image analysis data. This processing is also lossless (i.e., no pixels are pushed out of the frame.). In this technique, horizontal pixel lines are rotated to re-align an image with the true vertical orientation. The technique works for rotational camera motion within an environment (e.g., when the camera is spinning).

In one embodiment, to encourage users to share content, the platform may reward the user with credits when his/her content is accessed/used by other members of a group or community. Furthermore, a user may spend credits to access other content streams on the community platform. In this way, users are incentivized to carry a camera and to capture compelling content. If socially important spherical content is made available by a particular user, the user could generate an income-stream as people access that content and post their own edits.

Operation of Spherical Media Content System

Figure 6:
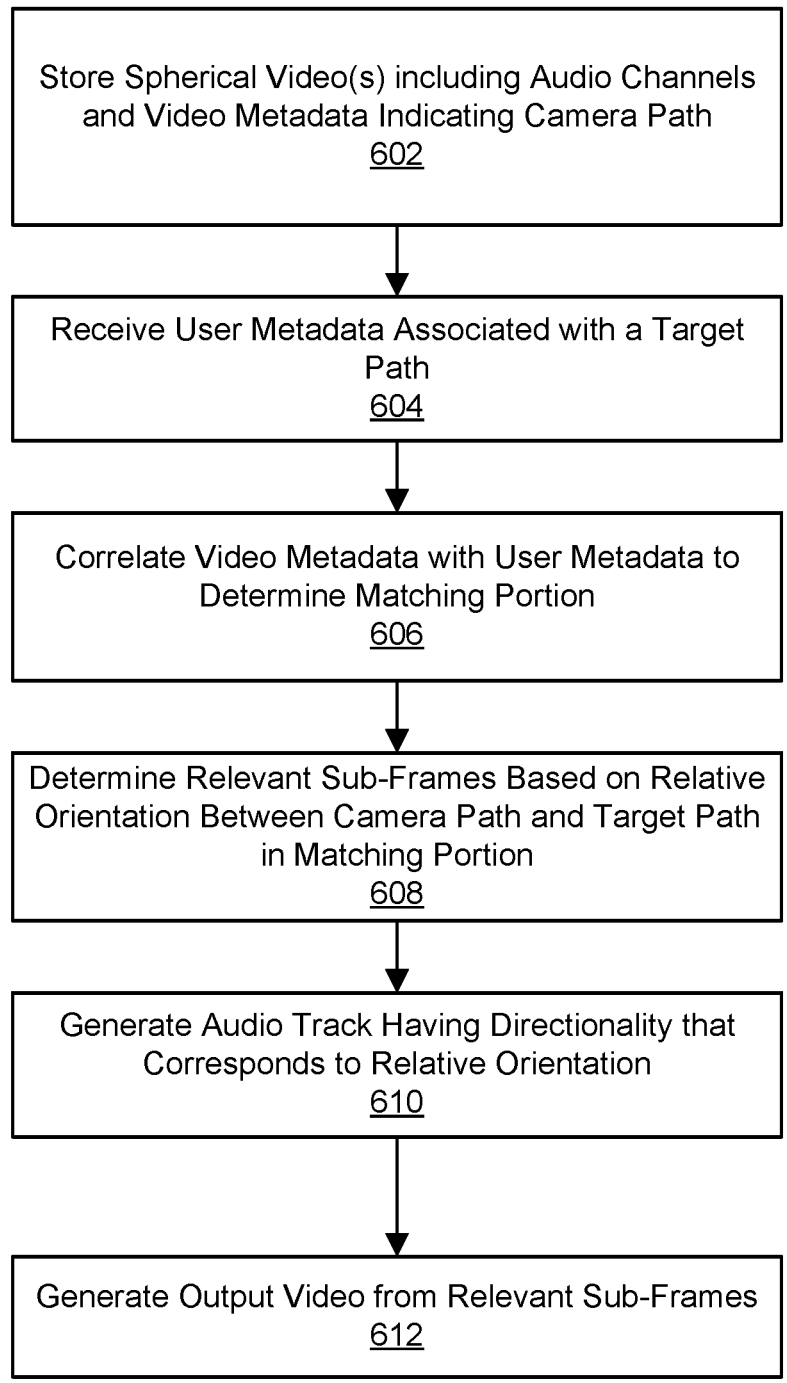
FIG. 6 illustrates an example embodiment of a process for generating an output video relevant to a target path from one or more spherical videos.

FIG. 6 illustrates an example embodiment of a process for automatically generating an output video from spherical video content relevant to a particular target based on location tracking. The video server 240 stores 602 one or more spherical videos (including audio channels) and associated video metadata including at least time and location metadata indicating a time and location that the spherical content was captured. The time and location metadata may be generally associated with the video in its entirety (i.e., a single timestamp or time interval and general location associated with the entire video), or may include a sequence of time and location data points associated with different portions of the video (e.g., on a frame-by-frame basis or block-by-block basis). The spherical videos each include a plurality of audio channels each comprising an audio signal associated with a particular direction. User metadata is then received 604 representing a target path of interest (e.g., a sequence of time-stamped locations representing a path of the user or object or scene of interest). The video metadata is correlated 606 with the user metadata to determine a matching portion. For example, in one embodiment, a matching portion is found when over a predefined minimum time duration (e.g., 5 seconds, 10 seconds, etc.) the camera is within a predefined distance from the target path. Thus, over this time range, the user, object, scene or other target of interest is nearby the camera and is highly likely to be depicted somewhere in the captured spherical content. Once a matching portion is found, the video server 240 determines 608, for each frame of the matching portion of spherical content, a relevant sub-frame to extract from the spherical content. For example, in one embodiment, the relevant sub-frame is determined based on the user and video metadata by computing a relative direction between the camera and the target at the times corresponding to each frame of the matching portion of spherical content. Then, based on the relative direction and known orientation of the spherical camera, the sub-frame can be chosen centered in that direction and thus likely to depict the target. A different sub-frame location may be selected for each frame of the matching portion so as to track a moving target. The video server 240 also generates 610 an audio track from the plurality of audio channels in which the directionality of the audio signal corresponds to the orientation between the camera path and the target path at each frame. For example, in one embodiment, audio samples are generated having a directionality of the selected sub-frame during the time interval associated with each sub-frame (e.g., $\frac{1}{30}^{th}$ second or $\frac{1}{60}^{th}$ second depending on the frame rate). In alternative embodiments, a moving window may be used in which the directionality of the audio signal for a given time interval associated with a sub-frame is based on a average location of a plurality of sub-frames around the sub-frames. In yet other embodiments, the directionality of the audio track is updated for time intervals longer than a single frame in length and may be computed over multiple frames. An output video is then generated 612 from the relevant sub-frames.

In another embodiment, an output video may be generated from two or more different spherical videos. For example, two or more different portions (which may be overlapping) of the user metadata may have matches against two different spherical videos. A first portion of the output video can then be generated by extracting relevant sub-frames from the corresponding first spherical video and a second portion of the output video can be generated by extracting relevant sub-frames from the corresponding second spherical video. If the matching portions overlap, the video server 240 may automatically determine when to cut from the first spherical video to the second spherical video. For example, the video server 240 may to determine to transition between the videos in a manner that maintains the shortest distance between the camera and the target. As the number of shared spherical videos within a given vicinity increases, users may be able to generate increasingly longer output videos tracking a given target path through an environment by combining relevant sub-frames from different spherical videos into a single combined output video.

Figure 7:
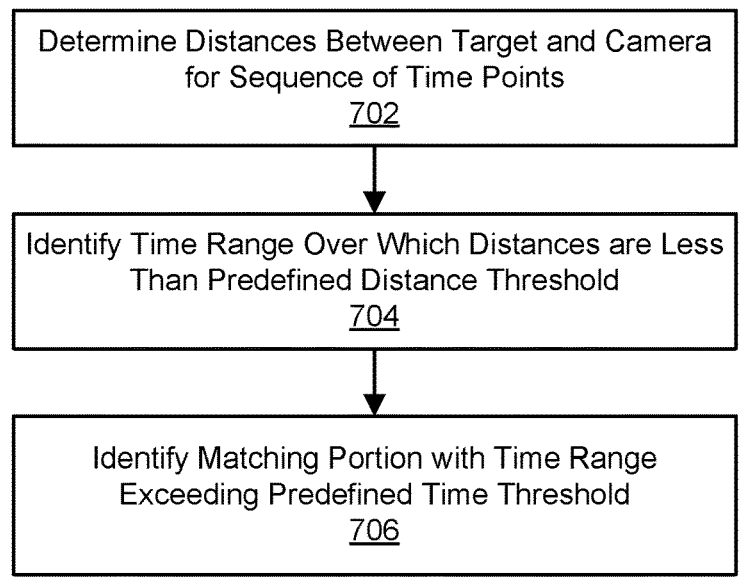
FIG. 7 illustrates an example embodiment of a process for determining a matching portion of a spherical video relevant to a target path.

FIG. 7 is a flowchart illustrating an example processing for determining a matching portion of spherical content with a target path. The video server 240 determines 702 distances between the target and the camera for a sequence of time points based on the user metadata and the video metadata. The video server 240 then identifies 704 time ranges over which the distances are less than a predefined distance threshold (i.e., the camera is close to the target). The video server 240 then identifies 706 a matching portion when the time range exceeds a predefined time threshold (i.e., the camera is maintained close enough to the target for a meaningful period of time from a video depicting the target can be generated).

Figure 8:
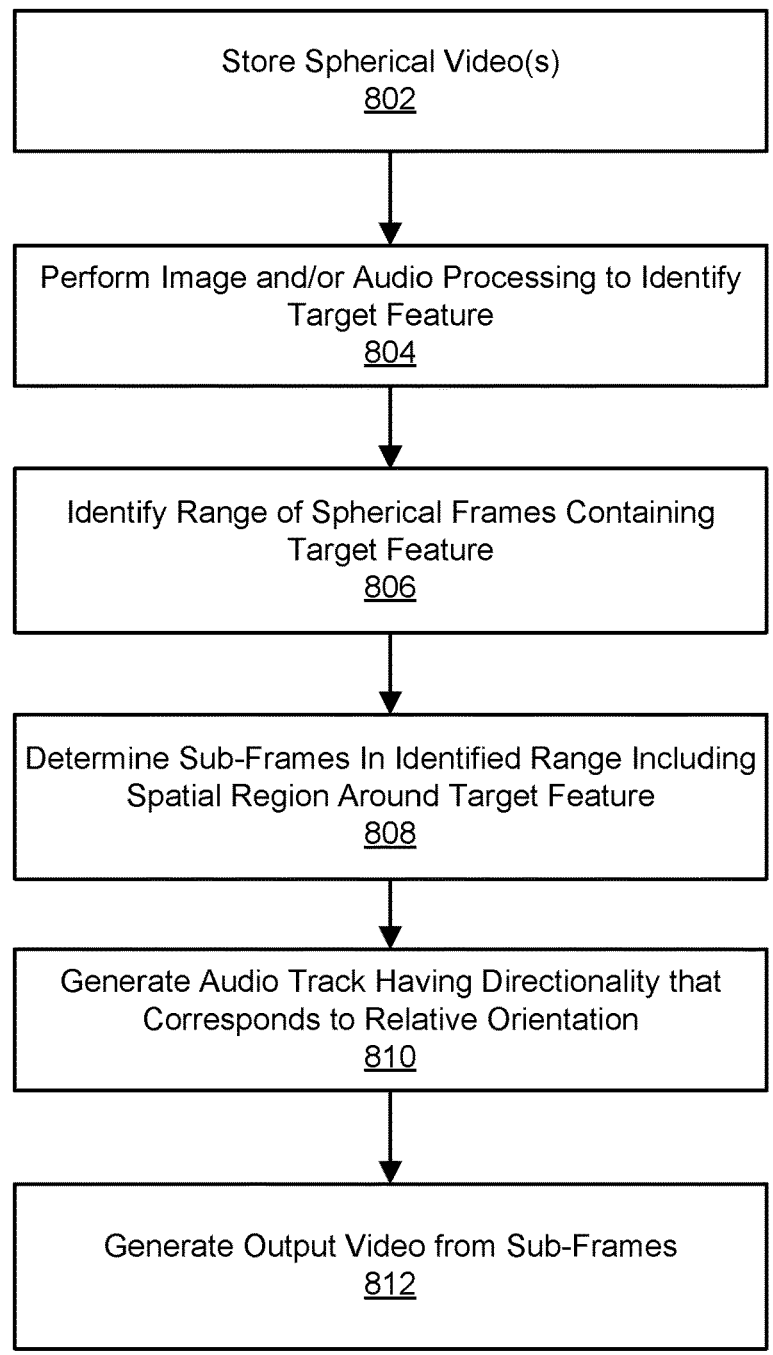
FIG. 8 illustrates an example embodiment of a process for generating an output video relevant to a target identified based on audio and/or visual analysis of spherical content.

Other techniques for identifying relevant sub-frames do not necessarily depend on location data associated with the target and instead identify sub-frames relevant to a particular target based on the spherical media content (e.g., visual and/or audio content) itself. FIG. 8 illustrates an embodiment of a process for generating an output video relevant to a particular target based on audio/video processing. The video server 240 stores 802 a plurality of spherical videos (including corresponding directional audio channels). The video server 240 performs 804 image and/or video processing to automatically identify a target feature that meets specified audio and/or visual criteria. For example, in one embodiment, a facial recognition algorithm is performed on the spherical content to identify and track a particular target face. Alternatively, rather than tracking one particular face, the video server 240 may track regions in the spherical video where faces are generally present. In yet another embodiment, an object recognition and/or object tracking algorithm is performed to identify a region of the spherical video containing one or more particular objects. In yet another embodiment, a motion analysis may be performed to identify a region of motion having some particular characteristics that may be indicative of an activity of interest. For example, a motion thresholding may be applied to locate objects traveling according to a motion exceeding a particular velocity, acceleration, or distance. In yet another embodiment, an audio analysis is performed on audio received from a microphone array to detect a direction associated with the sound source. The direction of the sound source can then be correlated to a particular spatial position within the spherical video (using, for example, a known orientation of the camera determined based on sensor data or visual cues). The position of the sound source can then be identified and tracked or adjusted based on the sound source location. For example, if the audio in a particular directional microphone not currently within the view window of the output video is perceived to be louder or more important than the audio direction corresponding to the view window, a cue can be generated to automatically move the view window to the predominant audio direction in the spherical content. Alternatively, rather than moving the view window automatically, a visual cue may be generated in an editor user interface that suggests to the editor to move the view window in the direction of the predominant audio source. In one embodiment, the view window may automatically pan, shift, or turn towards the predominant audio source at a given speed so as to smoothly transition between directions.

In another embodiment, audio detected using directional microphones can be coupled with faces or other recognized visual elements that are potential audio sources. For example, in one embodiment, if a directionality of an audio signal is determined to sufficiently correspond to a location of a face (detected via a face detection algorithm) or other sound source, the audio in the output video can be weighted based on the determined scene motion in the view window such that the audio experience is associated with the visual elements, i.e., the directionality of the audio signal tracks the direction of motion of the discovered sound source. Furthermore, the directional audio signal may be used to further improve a scene motion analysis algorithm (such as face or object tracking) by weighting the prediction location of the face or object more heavily when it is well-correlated to the change in audio directionality.

Furthermore, in one embodiment, speech recognition may be used to differentiate a sound of interest from background noise. For example, a user may speak a command such as "tag me" or state the user's name to indicate that the user's location in the video. In other embodiments, a location of a target feature may be manually identified. In yet further embodiments, two or more of the techniques described above can be combined to identify a target feature of interest. For example, in one embodiment, different regions of the video may be scored based on a number of weighted metrics and a region corresponding to a target feature is chosen based on the weighted score.

Based on the identified target, a range of spherical frames is identified 806 that includes the target feature. For example, in one embodiment the range of spherical frames meets at least some minimum time duration to ensure that a meaningful length of video can be extracted. Sub-frames of the spherical video around the spatial location of the target feature are then determined 808 within the identified range. In one embodiment, sub-frame selection is performed in order to generally provide smooth transitions between frames of the output video (i.e., consecutive sub-frames in the output video generally have spatial regions within some small distance threshold of each other) to provide an output video that closely resembles the output of a camera that pans across a scene without discontinuous jumps. An audio track is generated 810 having directionality corresponding to the relative orientation between the camera and the target feature of interest. An output video is then generated 812 from the relevant sub-frames and audio track in order to produce an output video having a reduced field of view and corresponding directional audio tracking the object or region of interest.

In another embodiment, the video server 240 can generate an output video from a statically located sub-frame that corresponds to a center region (or other predefined region) of one the image captured by one of the lenses. If the user knows which lens is considered the "forward-looking" (e.g., based on a physical feature of the camera body), the user can "point" the spherical camera so that the forward-looking lens is oriented in the direction of interest. In other words, the user points the spherical camera in the same way that a user would operate a standard camera with a standard (non-spherical) field-of-view. In this way, a video can be generated that would be equivalent to what would have been captured by a camera having a standard (non-spherical) field-of-view. However, because the camera captures in all directions, the remaining content outside the center sub-frames may be of interest in generating other secondary videos using the techniques described above.

As described above, different portions of a given spherical video may be relevant to a large number of different users of the sharing community. In one embodiment, rather than the video server 240 storing individual output videos generated for each of its users, the video server can instead store an edit map specifying how the desired output video can be regenerated from the original raw spherical video and/or how the audio track can be reconstructed from the available audio channels (e.g., storing pointers to the audio channels and associated weights at different sample times). Then, the output video can be generated on request (e.g., in real-time) from the edit map when a user requests viewing. For example, the output video can be streamed to the user or the user can download the output video to the user's own local storage. An advantage of this approach is that individual output videos for specific users need not be stored by the video server 240, thus reducing its storage requirements. This storage savings may be significant because it is expected that a large number of personalized output videos may be generated from a relatively small number of shared spherical videos.

Figure 9:
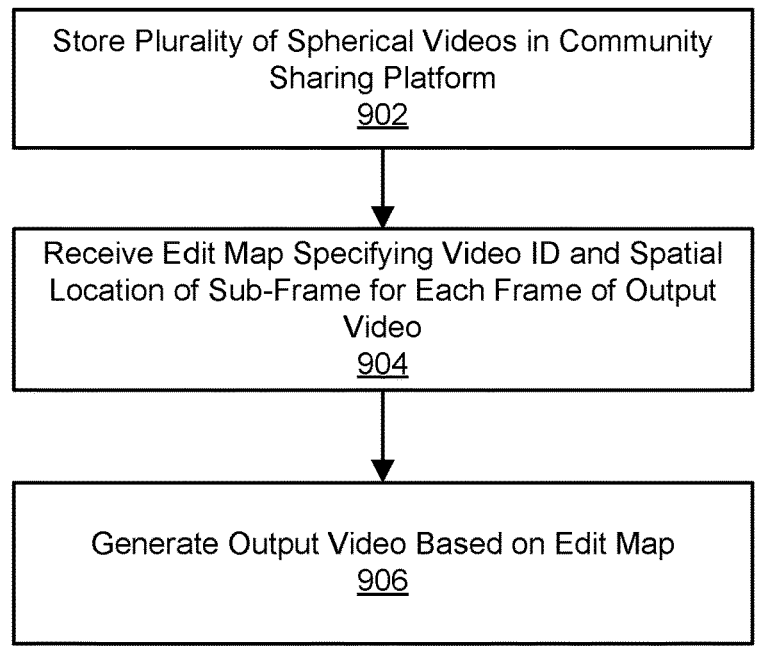
FIG. 9 illustrates an example embodiment of a process for generating an output video based on an edit map.

FIG. 9 illustrates an embodiment of a process for managing media content generated from spherical video. The video server 240 stores 902 a plurality of spherical videos using the community sharing platform. To generate an output video, the video server 240 receives 904 an edit map that specifies for each frame time of an output video, an identifier of a spherical video and spatial location of a sub-frame in the identified spherical video. The video server 240 then generates 906 the output video based on the edit map. In addition to specifying the relevant sub-frames, the edit map may further specify other editing or video processing functions to be performed on the raw spherical video to generate the output video. For example, the video server 240 may apply stitching, image stabilization, or rolling artifact reduction algorithms. By performing stitching or adding other video processing effect upon video generation, the video server 240 can beneficially limit the processing to the selected sub-frames instead of performing the processing algorithms on the entire spherical content.

For audio, the edit map may specify how to reconstruct the output audio track from the stored audio channels by indicating the weights to apply to each audio channel at different time instances. Alternatively, the video server 240 may automatically determine the weights when the video is requested based on the selected frames.

In one embodiment, the raw spherical video is stored by the video server 240 as two or more unstitched portions. For example, if the spherical video is captured with a camera having two hemispherical lenses as described above, the two hemispherical videos are stored by the video server 240 as separate raw files in an unstitched form. Then, the videos may be stitched together when generating the output video only if a selected sub-frames includes image data from more than one unstitched portion of the spherical content. Beneficially, if a given sub-frame is entirely within one hemisphere, no stitching need be performed for that sub-frame. Furthermore, where stitching is performed, the size of the edge for stitching is limited by the dimensions of the sub-frame and processing is substantially reduced compared to performing stitching on the entire spherical video.

Figure 10:
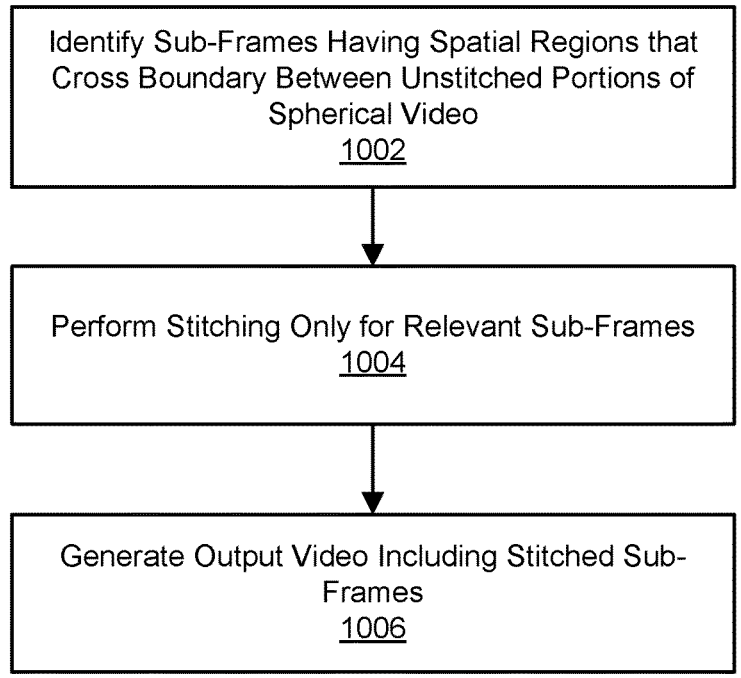
FIG. 10 illustrates an example embodiment of a process for stitching relevant sub-frames of an output video based on unstitched spherical video.

FIG. 10 illustrates an example embodiment of a process for generating an output video from unstitched spherical video based on a selection of sub-frames. The video server 240 identifies 1002 which of the selected sub-frames have spatial regions that cross boundaries between unstitched portions of spherical video. The video server 240 then performs 1004 stitching only as needed within the relevant sub-frame. The output video is then generated 1006 including the stitched sub-frames (and the other sub-frames that did not require stitching). This technique thus provides substantial savings in processing relative to a system that stitches the entire spherical video in pre-processing. Other video editing effects (e.g., image stabilization, rolling shutter artifact reduction, image enhancement, etc.) may be similarly limited to the sub-frames and need not be performed for the entire output video.

As described above, the edit map may be generated automatically based on metadata or based on audio/visual processing to identify relevant target features. Alternatively, edit maps may be generated manually using a spherical video viewer and editing tools available through the video server 240. For example, in one embodiment, the video server 240 displays a selected spherical video in a spherical video viewer and receives user inputs indicating selections of the desired sub-frames at each frame of the selected spherical video. The edit map can then be specified based on the user selections.

In one embodiment, previously generated output videos (either automatically or manually generated) may be available for manual editing by users in order to further refine the output videos. For example, users may edit the videos to adjust the sub-frame location at each frame, change cut locations between videos when multiple overlapping matching portions exist, or apply other video processing effects.

Figure 11A:
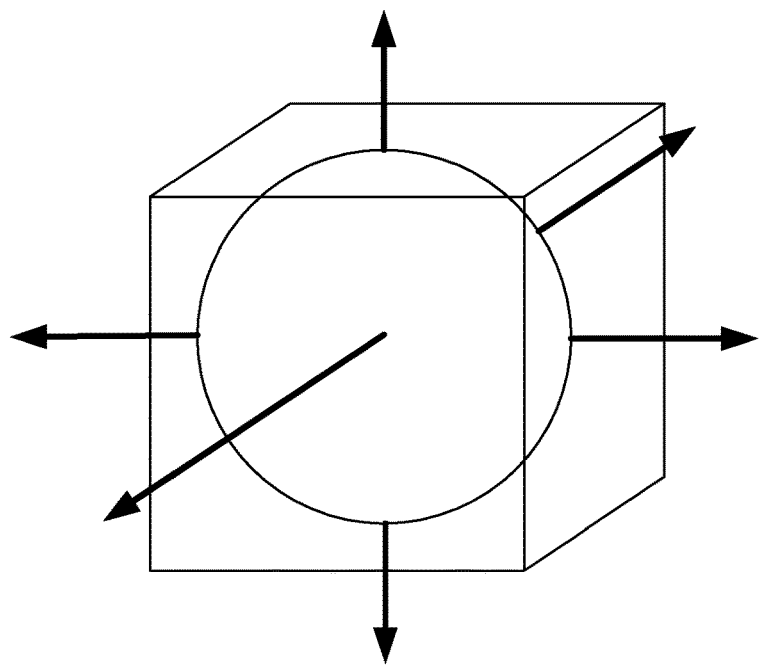
FIG. 11A illustrates a first example orientation of audio channels in a camera having a microphone array.
Figure 11B:
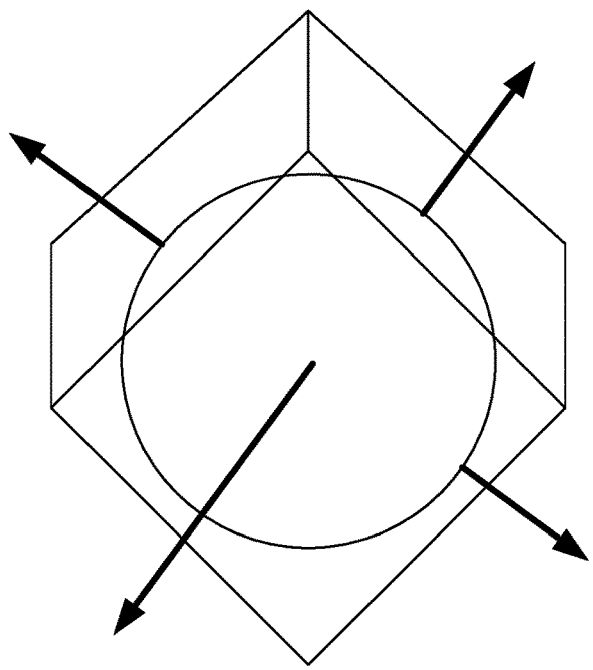
FIG. 11B illustrates a second example orientation of audio channels in a camera having a microphone array.

FIGS. 11A-B illustrate examples of microphone positioning in an example spherical capture system. In FIG. 11A, six directional microphones may be positioned on six different sides (e.g., left, right, top, bottom, front, back) of a spherical capture device to capture audio from six different directions. Alternatively, more or fewer microphones may be used and various beamforming techniques may be applied to generate a plurality of audio channels, each corresponding to a different direction. In this case, there is not necessarily a one-to-one correspondence between a microphone and an audio channel. Rather, audio from multiple microphones may be weighted and combined to contribute to a single audio channel or audio data corresponding to a particular direction may be interpolated based on microphones oriented in different directions.

As illustrated in FIGS. 11A and 11B, the spherical video capture system may be oriented in any direction when capturing spherical video and the orientation of the camera may be unknown when processing the output video. The relative orientation of the microphones may therefore also be unknown and a challenge therefore exists in how to ensure that the audio directionality is mapped consistently with capture direction. For example, in FIG. 11A, the spherical capture system is oriented in a "nominal" orientation in which the vertical axis is co-linear with the world vertical axis. In this case, six directional microphones cover 4 horizontal quadrants and two vertical polar quadrants and are aligned on the axes of the nominal orientation. However, in FIG. 11B, the spherical video capture system is rotated off-axis (e.g., by 45 degrees) relative to the world vertical axis. Thus, the orientation of the directional microphones covering the scene is different than in the orientation of FIG. 11A and the directionality associated with the captured audio will therefore be different. Thus, if the output sub-frames of the output video are stabilized on a particular subject, the relative orientations of the audio signals are different depending on the orientation of the camera that was used during capture.

Figure 12A:
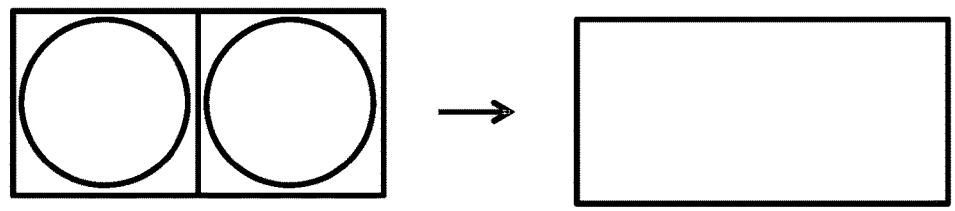
FIG. 12A illustrates an example mapping of captured spherical video content to a flattened rectangular projection.
Figure 12B:
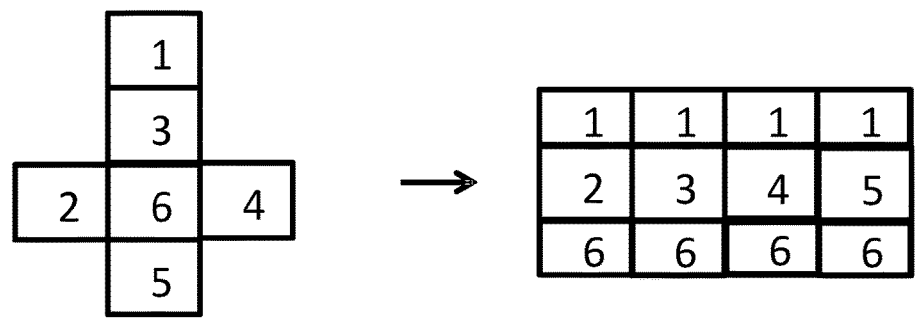
FIG. 12B illustrates an example mapping of captured directional audio content to a flattened rectangular projection.
Figure 12C:
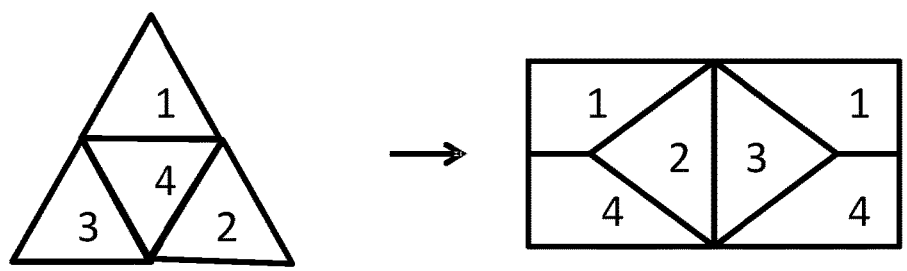
FIG. 12C illustrates an example mapping of captured directional audio content to a flattened rectangular projection.

To address the problem above, in one embodiment, an audio map may be generated that links the different audio channels to different spatial regions (or "audio zones") of the spherical video. As shown in FIG. 12A, a spherical video may be created by stitching together video captured from two circular hemispherical cameras, each producing a circular hemispherical image. The spherical video in FIG. 12A is shown in a flattened state (i.e., mapped to a rectangular area) for ease of description herein. FIGS. 12B and 12C illustrate different examples of mappings of the audio channels to different spatial regions of the spherical video. For example, in FIG. 12B, a cubic model is used in which each face of a six-sided cube represents a plane perpendicular to an audio capture direction. The six audio channels may be generated from six directional microphones, or a different number of microphones may be used and the audio combined to create each of the six directional audio channels. As shown in FIG. 12B, each side of the unfolded cube can be mapped to a spatial area of the flattened spherical video. Then, when generating the output video, the appropriate audio channel is selected depending on the overlap of the sub-frames being output with the different spatial regions. For example, when the output sub-frame is fully within region 1, only the audio channel corresponding to region 1 may be used, or the audio channel corresponding to region 1 may be weighed most heavily in combination with other audio channels. In another example, if the output sub-frame is partially within region 1, partially within regions 2, and partially within region 3, then the output audio may include a mix of audio channels with those corresponding to regions 1, 2, and 3 weighed most heavily. In one embodiment, the weights may be proportional to an amount of overlap with each region.

FIG. 12C illustrates a tetrahedral model in which each face of a four-sided tetrahedron represents a plane perpendicular to an audio capture direction. The four audio channels may be generated from four directional microphones, or a different number of microphones may be used and the audio combined to create each of the four directional audio channels.

Figure 13:
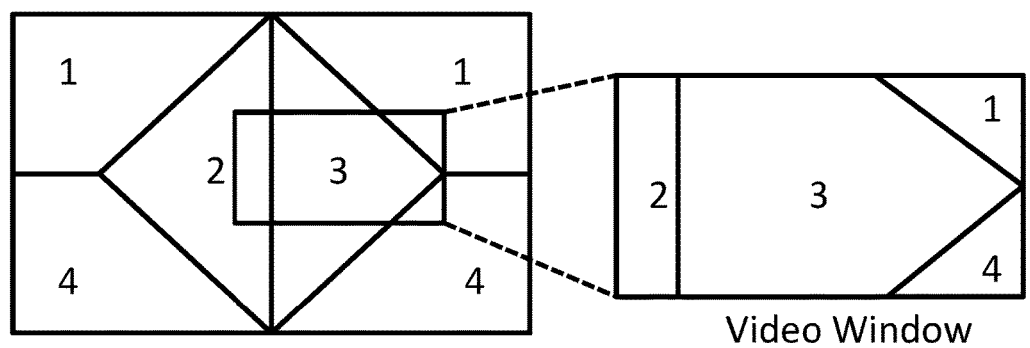
FIG. 13 illustrates an example mapping of captured directional audio content to a flattened rectangular projection.
Figure 13:
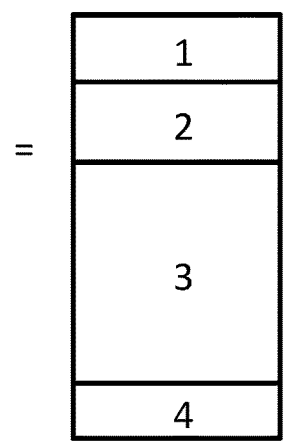

FIG. 13 illustrates an example mapping using the tetrahedral model, with four audio channels each corresponding to a direction perpendicular to a face of a tetrahedron. Here, a video sub-frame is selected from the center right portion of the flattened spherical video frame. Using the tetrahedral mapping described above, this window primarily includes region 3, but also includes parts of regions 1, 2, and 4. The regions may be weighted based on the area of each spatial region in the selected video window, and the audio from the corresponding channels combined according to the weighting. Thus, the output audio associated with the depicted video window includes audio from each of the four channels, with channel 3 weighted mostly heavily. The weighting may be based on the area of overlap between the sub-frame and the spatial regions corresponding to the different audio channels.

It is also apparent from FIG. 13 that the weighting of the audio channels may change if zoom is applied thereby reducing the field of view of the sub-frame. For example, if zoom is applied to the sub-frame of FIG. 30, the weighting of spatial region 3 may increase even more. In one embodiment, weighting may change depending on the zoom level in order to create the desired balance of audio.

In one embodiment, the audio output always includes contributions for each of the audio channels. In this embodiment, the channels may be weighted so that some directions are more prominent, but none of the channels reduce to zero.

In one embodiment, a stereo or surround audio output can be synthesized using the mapping technique described above.

Figure 14:
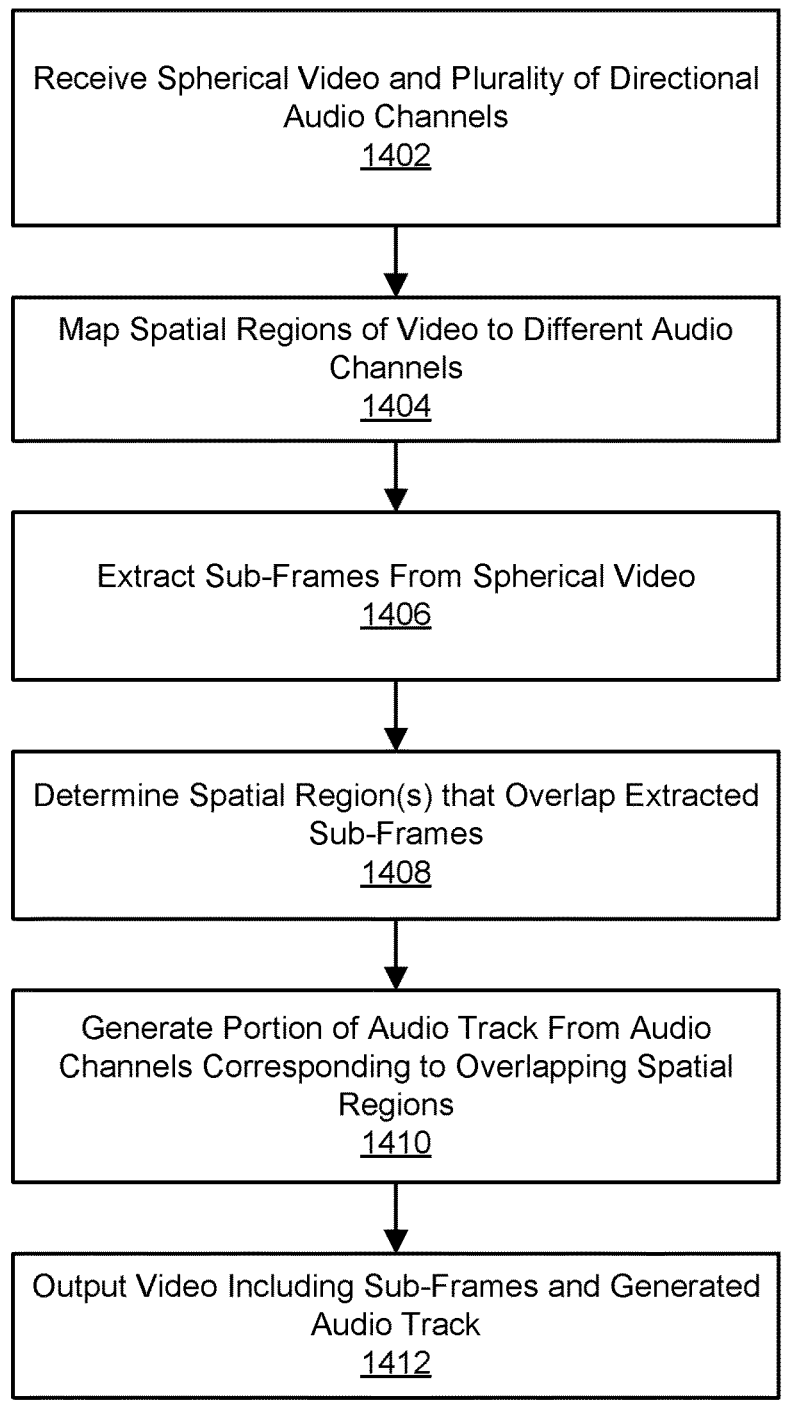
FIG. 14 illustrates an example embodiment of a process for generating an audio track associated with spherical video based on a plurality of directional audio channels.

FIG. 14 is a flowchart illustrating an embodiment of a process for generating an audio track corresponding to a video using the techniques described above. A spherical video and a plurality of audio channels are received 1402 where each of the plurality of audio channel comprises a directional audio signal corresponding to a particular direction, as may be generated from a microphone array. Different spatial regions of the spherical video are then mapped 1404 to different audio channels using, for example, a predefined spatial map. For each of the plurality of frames of the spherical video, a sub-frame is extracted 1406 using any of the techniques described above. For each sub-frame (or for a sequence of adjacent sub-frames) one or more spatial regions in the spatial map overlapping the sub-frame is determined 1408. A portion of the audio stream (e.g., a plurality of samples in a time interval corresponding to the sub-frame or a plurality of adjacent sub-frames) is generated 1410 from the plurality of audio channels corresponding to the overlapping regions. For example, in one embodiment the audio channel corresponding to the spatial region that has the most overlap (e.g., by area) with the sub-frame is used. Alternatively, a weighted average may be used as described above in FIG. 13. The output video (including audio) is then outputted 1412 from the sequence of sub-frames and corresponding audio.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A method for generating a video with corresponding audio, the method performing by a computing system including one or more processors, the method comprising:
   receiving, by the computing system, a video, the video comprising frames including a target, the video having a field of view;
   receiving, by the computing system, directional audio signals captured concurrently with the video;
   determining, by the computing system, a time-varying path of the target within the video based on an analysis of content of the video or information associated with the video;
   identifying, by the computing system, sub-frames from the frames based on the time-varying path of the target, the sub-frames having a reduced field of view relative to the field of view of the video, the sub-frames including the target;
   generating, by the computing system, an audio stream from the directional audio signals based on the time-varying path of the target, the audio stream including portions of one or more of the directional audio signals corresponding to a direction of the target; and
   outputting, by the computing system, the sub-frames and the audio stream.

2. The method of claim 1, wherein determining the audio stream further comprises selecting the portions based on matching directionalities of the directional audio signals with the direction of the target.

3. The method of claim 1, wherein the directional audio signals correspond to directions perpendicular to faces of at least one member of a group consisting of: a tetrahedron, a cube, or a pyramid.

4. The method of claim 1, wherein the information associated with the video includes location information generated by a tracking device carried by the target.

5. The method of claim 1, wherein the analysis of the content of the video includes visual recognition of the target within the video.

6. The method of claim 5, wherein the visual recognition of the target includes facial recognition, object recognition, motion recognition, or gesture recognition.

7. The method of claim 1, wherein the information associated with the video includes a directionality of an audio source of one or more of the directional audio signals.

8. The method of claim 1, wherein a scene motion analysis is performed based on the directional audio signals.

9. A non-transitory computer-readable storage medium storing instructions for generating a video with corresponding audio, the instructions when executed by one or more processors causing the one or more processors to perform steps including:
    receiving a video, the video comprising frames including a target, the video having a field of view;
    receiving directional audio signals captured concurrently with the video;
    determining a time-varying path of the target within the video based on an analysis of content of the video or information associated with the video;
    identifying sub-frames from the frames based on the time-varying path of the target, the sub-frames having a reduced field of view relative to the field of view of the video, the sub-frames including the target;
        generating an audio stream from the directional audio signals based on the time-varying path of the target, the audio stream including portions of one or more of the directional audio signals corresponding to a direction of the target; and outputting the sub-frames and the audio stream.

10. The non-transitory computer-readable storage medium of claim 9, wherein determining the audio stream further comprises selecting the portions based on matching directionalities of the directional audio signals with the direction of the target.

11. The non-transitory computer-readable storage medium of claim 9, wherein the directional audio signals correspond to directions perpendicular to the faces of at least one member of a group consisting of: a tetrahedron, a cube, or a pyramid.

12. The non-transitory computer-readable storage medium of claim 9, wherein the information associated with the video includes location information generated by a tracking device carried by the target.

13. The non-transitory computer-readable storage medium of claim 9, wherein the analysis of the content of the video includes visual recognition of the target within the video.

14. The non-transitory computer-readable storage medium of claim 13, wherein the visual recognition of the target includes facial recognition, object recognition, motion recognition, or gesture recognition.

15. A system for generating a video with corresponding audio, the system comprising:
    one or more processors; and
    a non-transitory computer-readable storage medium storing instruction that when executed by the one or more processors causes the one or more processors to perform steps including:
        receiving a video, the video comprising frames including a target, the video having a field of view;
        receiving directional audio signals captured concurrently with the video;
        determining a time-varying path of the target within the video based on an analysis of content of the video or information associated with the video;
        identifying sub-frames from the frames based on the time-varying path of the target, the sub-frames having a reduced field of view relative to the field of view of the video, the sub-frames including the target;
        generating an audio stream from the directional audio signals based on the time-varying path of the target, the audio stream including portions of one or more of the directional audio signals corresponding to a direction of the target; and
        outputting the sub-frames and the audio stream.

16. The system of claim 15, wherein determining the audio stream further comprises selecting the portions based on matching directionalities of the directional audio signals with the direction of the target.

17. The system of claim 15, wherein the directional audio signals correspond to directions perpendicular to faces of at least one member of a group consisting of: a tetrahedron, a cube, or a pyramid.

18. The system of claim 15, wherein the information associated with the video includes location information generated by a tracking device carried by the target.

19. The system of claim 15, wherein the analysis of the content of the video includes visual recognition of the target within the video.

20. The system of claim 15, wherein the information associated with the video includes a directionality of an audio source of one or more of the directional audio signals.

* * * * *